Patented Sept. 21, 1926.

1,600,437

UNITED STATES PATENT OFFICE.

RENÉ DE M. TAVEAU, OF ELIZABETH, NEW JERSEY, ASSIGNOR TO THE TEXAS COMPANY, OF NEW YORK, N. Y., A CORPORATION OF TEXAS.

PURIFICATION OF CRUDE ALCOHOLS.

No Drawing.    Application filed August 5, 1924. Serial No. 730,243.

My invention relates to the preparation of alcohols from cracked petroleum gases and more particularly to the purification of the crude alcohols so obtained.

When isopropyl alcohol is prepared from petroleum still gases it usually possesses a peculiar disagreeable odor which is frequently attributed to the presence of small amounts of organic sulphur compounds; in addition, the crude distilled alcohol retains more or less color. Both of these characteristics decrease its value and render its sale more difficult. The purpose of my invention, therefore, is to improve the odor of the crude alcohol and derive a pure water-white product at small expense.

It has previously been considered necessary to subject the crude alcohol to somewhat complicated chemical treatments to produce the desired purity of product. However, I have discovered that this result can be accomplished by distilling the alcohol over a small amount of pure alkali. I prefer to use from 1 to 2% of solid sodium hydroxid for the purifying medium as compared with the amount of crude alcohol to be treated. The sodium hydroxid should be the usual fused caustic and should not contain any appreciable amount of water. The mixture is now distilled directly from the alkali. A very intimate and thorough treatment with the alkali is secured owing to the fact that it dissolves in the alcohol as it is being brought up to distillation temperature. The distillate is found to be free from any coloring matter and bears only the characteristics ordor of isopropyl alcohol, such properties being retained indefinitely.

After the distillation has been completed, the alkali may be removed from the still, heated and finally fused, to become available for treatment of further amounts of alcohol or otherwise utilized. Also larger proportions of alkali may be used, but such excess is unnecessary, satisfactory purification being accomplished by the amounts stated. In place of sodium hydroxid other alkalis, such as potassium or lithium hydroxids may be substituted since these substances have proven equally effective to bring about the desired results.

What I claim is:

1. The process of purifying alcohols derived from cracked petroleum gases which consists in distilling the crude alcohols over non-aqueous sodium hydroxid.

2. The process of treating crude alcohols derived from cracked petroleum gases which consists in distilling the alcohols over non-aqueous alkali.

3. The process of treating crude alcohols derived from cracked petroleum gases which consists in distilling the alcohols over 1 to 2% of non-aqueous sodium hydroxid.

In witness whereof I have hereunto set my hand this 31st day of July 1924.

RENÉ DE M. TAVEAU.